US006567380B1

(12) United States Patent
Chen (10) Patent No.: US 6,567,380 B1
(45) Date of Patent: May 20, 2003

(54) TECHNIQUE FOR SELECTIVE ROUTING UPDATES

(75) Inventor: Enke Chen, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/343,308

(22) Filed: Jun. 30, 1999

(51) Int. Cl.[7] .............................. H04L 12/28; H04J 3/26
(52) U.S. Cl. .................................. 370/238; 370/395.31
(58) Field of Search ................................. 370/230, 231, 370/238, 238.1, 252, 389, 392, 399, 397, 257, 395.3, 395.31, 402; 709/238–242

(56) References Cited

U.S. PATENT DOCUMENTS

| | | | | |
|---|---|---|---|---|
| 5,243,592 | A | * | 9/1993 | Perlman et al. ............. 370/252 |
| 5,519,704 | A | * | 5/1996 | Farinacci et al. ........... 370/402 |
| 5,717,687 | A | * | 2/1998 | Minot et al. ................ 370/257 |
| 5,856,974 | A | | 1/1999 | Gervais et al. |
| 5,881,243 | A | | 3/1999 | Zaumen et al. |
| 5,898,687 | A | | 4/1999 | Harriman et al. |
| 5,917,820 | A | | 6/1999 | Rekhter |
| 5,959,989 | A | | 9/1999 | Gleeson et al. |
| 5,964,841 | A | | 10/1999 | Rekhter |
| 6,078,590 | A | | 6/2000 | Farinacci et al. |
| 6,084,858 | A | * | 7/2000 | Matthews et al. .......... 370/238 |
| 6,094,525 | A | | 7/2000 | Perlman et al. |
| 6,097,718 | A | | 8/2000 | Bion |
| 6,167,444 | A | | 12/2000 | Boden et al. |
| 6,173,324 | B1 | | 1/2001 | D'Souza |
| 6,260,070 | B1 | | 7/2001 | Shah |
| 6,295,296 | B1 | | 9/2001 | Tappan |
| 6,327,251 | B1 | | 12/2001 | Bion |
| 6,385,615 | B1 | * | 5/2002 | Haeri et al. ................. 709/238 |
| 6,392,997 | B1 | * | 5/2002 | Chen ........................... 370/252 |
| 6,421,731 | B1 | * | 7/2002 | Ciotti et al. ................. 709/238 |

OTHER PUBLICATIONS

Y. Rekhter and T. Li, Request for Comments (RFC) 1771. (3/95), pp. 1–15.

Tannenbaum, Computer Networks, 3rd Edition, 1996, Prentice Hall, pp. 479–576.

Chandra, Ravi and John Scudder, World Wide Web page http://www.ietf.org/internet–drafts/draft–ietf–idr–bgp4–cap–neg–03.txt, "Capabilities Negotiation with BGP–3", posted Mar. 10, 1999, pp. 1–4.

Chen, Enke, World Wide Web page http://www.search.ietf.org/internet–drafts–chen–bgp–route–refresh–01.txt, "Route Refresh Capability for BGP–4", posted Apr. 2, 1999, pp. 1–4.

Tony Bates, et al., World Wide Web page http://www.search.ietf.org/internet–drafts/draft–ietf–idr–bgp4–multiprotocol–v2–02.txt, "Multiprotocol Extensions for BGP–4", posted Apr. 2, 1999, pp. 1–10.

Perlman, Radia, "Interconnections: Bridges and Routers", Copyright 1992, pp. 323–329.

Cisco IOS Release 11.3, "Network Protocols Configuration Guide, Part 1", Copyright 1997, pp. P1C–160–P1C–161.

Y. Rekhter, et al., World Wide Web page http://www.ietf.org/internet–drafts/draft–ietf–idr–bgp4–08.txt, "A Border Gateway Protocol 4 (BGP–4)", posted Mar. 10, 1999, pp. 1–54.

World Wide Web page http://www.cisco.com/univercd/cc/t...s120/12cgcr/np1_c/1cprt1/1cbgp.htm, posted Feb. 9, 1999, "Configuring BGP", pp. 1–44.

World Wide Web page http://www.optimized.com/COMPENDI/IP–Routg.htm, "IP Routing Understanding Routing with IP", posted Sep. 27, 1999, pp. 1–3.

* cited by examiner

*Primary Examiner*—Salvatore Cangialosi
(74) *Attorney, Agent, or Firm*—Cesari and McKenna, LLP (57) ABSTRACT

A technique allows selective generation of routing update messages by a router for its neighboring peer routers of a computer network. When an entry version number of a route is incremented, the reason (i.e., "what has changed") for the change in the best path of the route is identified and recorded. Recordation of the reason is effected using change flags. These flags, along with the characteristics of each neighbor peer router, are considered when determining whether the route is eligible for further consideration of routing updates to the neighbor.

43 Claims, 6 Drawing Sheets

TECHNIQUE FOR SELECTIVE ROUTING UPDATES

CROSS-REFERENCE TO RELATED APPLICATIONS

This invention is related to the following copending and commonly-assigned U.S. patent application Ser. No. 09/270,557 titled, Technique for Group-Based Routing Update with Limited Per Neighbor/Adjacency Customization, filed on Mar. 16, 1999 now U.S. Pat. No. 6,392,497.

FIELD OF THE INVENTION

This invention relates generally to computer networks and, more particularly, to routing updates associated with routing protocols used in a computer network.

BACKGROUND OF THE INVENTION

A computer network is a geographically distributed collection of interconnected communication links for transporting data between nodes, such as computers. Many types of computer networks are available, with the types ranging from Local Area Networks (LANs) to Wide Area Networks (WANs). The nodes typically communicate by exchanging discrete frames or packets of data according to pre-defined protocols. In this context, a protocol consists of a set of rules defining how the nodes interact with each other.

Computer networks may be further interconnected by an intermediate node, called a router, to extend the effective "size" of each network. Since management of a large system of interconnected computer networks can prove burdensome, smaller groups of computer networks may be maintained as autonomous systems or routing domains. The networks within a routing domain are typically coupled together by conventional "intradomain" routers. Yet it still may be desirable to increase the number of nodes capable of exchanging data; in this case, "interdomain" routers executing interdomain routing protocols are used to interconnect nodes of the various routing domains. An example of an interdomain routing protocol is the Border Gateway Protocol (BGP) which performs routing between autonomous systems by exchanging routing and reachability information among interdomain routers of the systems. The interdomain routers configured to execute the BGP protocol, called BGP routers, maintain routing tables, transmit routing update messages and render routing decisions based on routing metrics.

Each BGP router maintains a routing table (related to BGP) that lists all feasible paths to a particular network. BGP peer routers residing in the autonomous systems exchange routing information under certain circumstances. Incremental updates to the routing table are generally performed. For example, when a BGP router initially connects to the network, the peer routers may exchange the entire contents of their routing tables. Thereafter when changes occur to those contents, the routers exchange only those portions of their routing tables that change in order to update their peers' tables. These update messages, which are sent in response to routing table changes, represent incremental updates that advertise only an optimal path to a particular network or that withdraw its reachability to the network. The BGP routing protocol is well-known and described in detail in *Request For Comments* (RFC) 1771, by Y. Rekhter and T. Li (1995), and *Interconnections, Bridges and Routers*, by R. Perlman, published by Addison Wesley Publishing Company, at pages 323–329 (1992), all disclosures of which are hereby incorporated by reference.

Broadly stated, a BGP router generates routing update messages for an adjacency or neighbor peer router by "walking-through" the routing table, identifying changes and applying appropriate routing policies. A routing policy is information that enables a BGP router to rank routes according to filtering and preference (i.e., the "optimal route"). Routing updates provided by the update message allows BGP routers of the autonomous systems to construct a consistent view of the network topology. The update messages are typically sent using a reliable transport, such as the Transmission Control Protocol (TCP), to ensure reliable delivery. TCP is a transport protocol implemented by a transport layer of the Internet Protocol (IP) architecture; the term TCP/IP is commonly used to denote this architecture. The TCP/IP architecture is well-known and described in *Computer Networks, 3rd Edition*, by Andrew S. Tanenbaum, published by Prentice-Hall (1996).

Generation of a routing update message by a router in accordance with a conventional update process may involve the following steps: (1) identifying a route in the routing table that has changed; (2) applying a per-neighbor route filtering policy, if appropriate; and (3) formating an update message, if appropriate. There is typically one or more paths associated with each route entry of the routing table; update message generation is concerned with the best path from among these paths. An entry version number is typically maintained for each route entry and used for incremental update operations. A routing table version number is also maintained and used to indicate a "level" of the routing table. The table version number is incremented each time there is a change to the routing table. Moreover each time there is a change to an entry in the routing table, such as when the entry is added or deleted or when there is a best path change, the table version number is incremented and the entry version number is set to that incremented value.

In addition, a neighbor version number may be maintained in a neighbor data structure for each neighbor to indicate whether the neighbor is up-to-date with all route changes in the routing table. For example, the neighbor version number may be compared with the entry version numbers and a route may be eligible for further consideration of routing updates to the neighbor if its entry version number is greater than the neighbor version number. The neighbor version number is set to the table version number after all entries in the route table have been evaluated (and advertised if necessary) for the neighbor.

Figure 1:
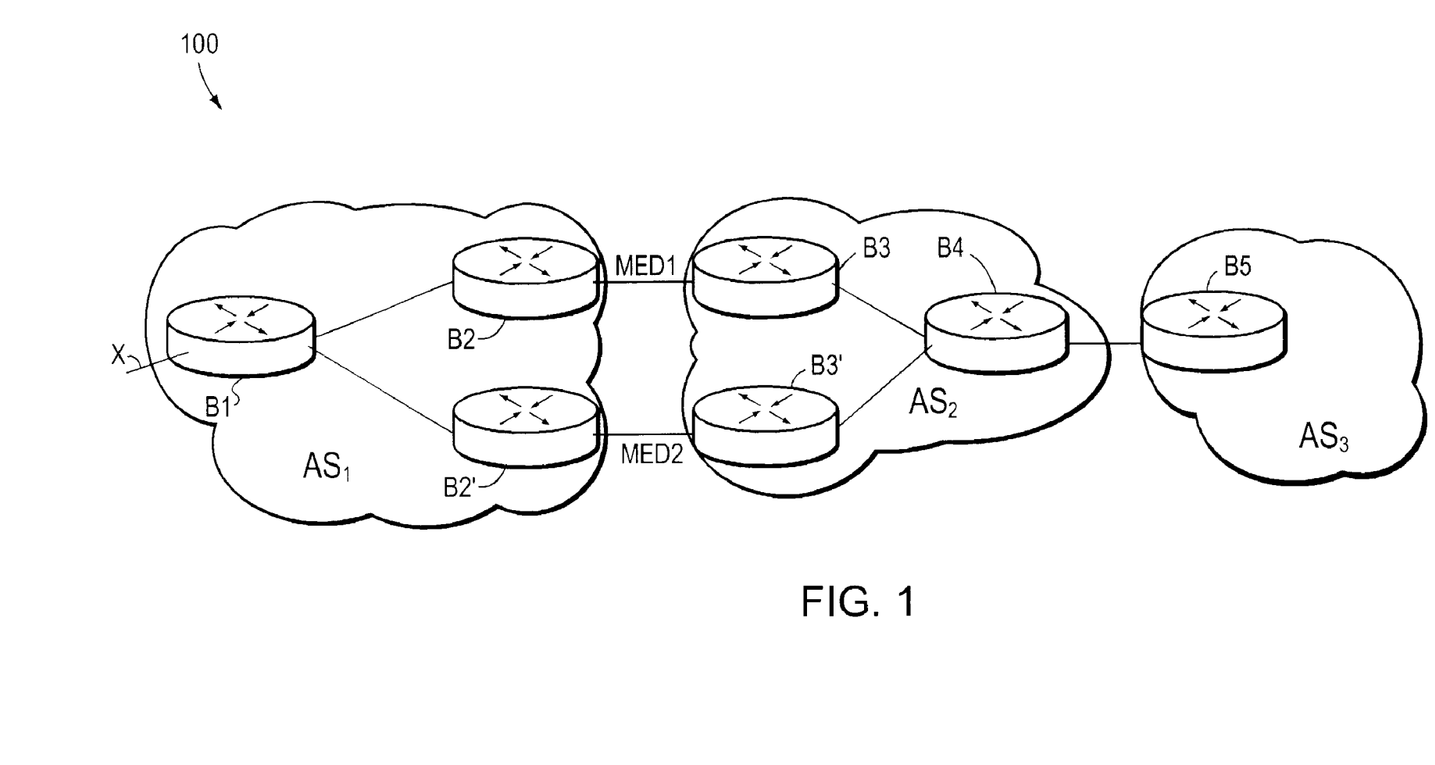
FIG. 1 is a schematic block diagram of a conventional computer network configured to exchange routing information among autonomous systems.

In certain situations, however, routing updates are not necessary for a neighbor having a neighbor version number that is less than an entry version number. FIG. 1 is a schematic block diagram of a conventional computer network 100 comprising a plurality of autonomous systems $AS_{1-3}$ configured to exchange routing information with (i.e., maintain) a plurality of "external" neighboring peer routers residing in the autonomous systems. Specifically, $AS_{1-2}$ maintains external peers B2–B3 and B2'–B3', while $AS_{2-3}$ maintains external peers B4–B5.

Assume that $AS_1$ advertises different multi-exit discriminator (MED) values MED1, MED2 to $AS_2$ over B2–B3 and B2'–B3', respectively, for a particular route X. A MED value is an optional non-transitive attribute of an update message. The MED value is used by an updating BGP "sender" in, e.g., AS1, to discriminate among multiple exit points to a BGP "receiver" in a neighboring autonomous system, such as $AS_2$. Further assume a path (i.e., the greater MED value) is initially advertised as a best path for route X by $AS_1$ to $AS_2$, and $AS_2$ advertises that path to $AS_3$. A preferred path (i.e., the lesser MED value) is subsequently advertised as the best path for X by $AS_1$ to $AS_2$. $AS_2$ transitions the best path to this preferred path and increments the entry version number for route X. As a result, an update message for route X may be sent to $AS_3$. This update message is considered a duplicate by $AS_3$ because (from its point of view) there is no change for route X. Since the generation and transmission of routing update messages by the sender as well as the processing of these messages by the receiver consume resources, it would be advantageous to provide a technique that avoids generation of such unnecessary routing updates.

SUMMARY OF THE INVENTION

The invention comprises a technique that allows selective generation of routing update messages by a router for its neighboring peer routers of a computer network. Broadly stated, when an entry version number of a route is incremented, the reason (i.e., "what has changed") for the change in the best path of the route is identified and recorded. That is, each time there is a new version of a route, attributes of the best path for the new version and the previous version of the route are compared and the changes are recorded. According to the selective routing update technique, recordation of the reason is effected using change flags. These flags, along with the characteristics of each neighbor, are processed by the router when determining whether the route is eligible for further consideration of routing updates to the neighbor.

In the illustrative embodiment, each change flag comprises a bit flag used to record, e.g., each of the following changes: (i) transitive attribute change; (ii) next-hop change; (iii) community change; (iv) interior gateway protocol (IGP) metric (to the next-hop) change; and (v) change in the best path. The bit flags are cumulative and cleared after the current version of a route has been evaluated (and sent if appropriate) for all neighbors. For example, if the entry version number of a route entry is incremented solely because of an IGP metric change and the receiving neighbor does not require notice of such a change, then generation of routing update message for the neighbor can be obviated.

Advantageously, the inventive technique minimizes generation of unnecessary (i.e., duplicate) routing update messages and improves network stability and scalability. In addition, the selective routing update technique provides a foundation for extending functionality in the area of routing updates.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 2:
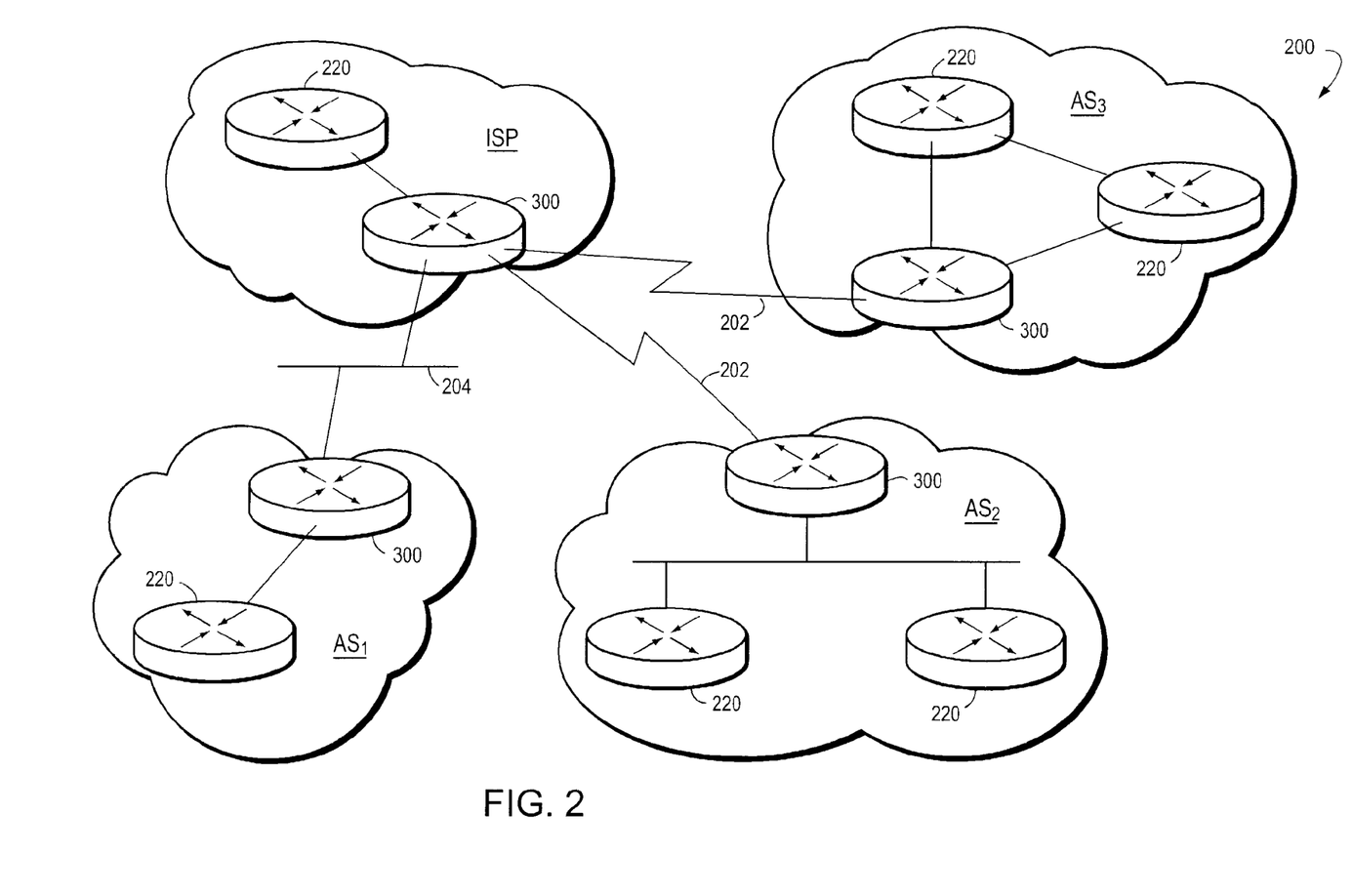
FIG. 2 is a schematic block diagram of a computer network comprising a plurality of autonomous systems interconnected by intermediate nodes, such as interdomain routers.

FIG. 2 is a schematic block diagram of a computer network 200 comprising a plurality of autonomous systems or routing domains interconnected by intermediate nodes, such as conventional intradomain routers 220 and interdomain routers 300. The autonomous systems may include an Internet Service Provider (ISP) domain and various routing domains ($AS_{1-3}$) interconnected by the interdomain routers 300. The interdomain routers 300 may be further interconnected by shared medium networks 204, such as Local Area Networks (LANs), and point-to-point links 202, such as frame relay links, asynchronous transfer mode links or other serial links. Communication among the routers is typically effected by exchanging discrete data frames or packets in accordance with predefined protocols, such as the Transmission Control Protocol/Internet Protocol (TCP/IP). It will be understood to those skilled in the art that other protocols, such as the Internet Packet Exchange (IPX) protocol, may be advantageously used with the present invention.

Figure 3:
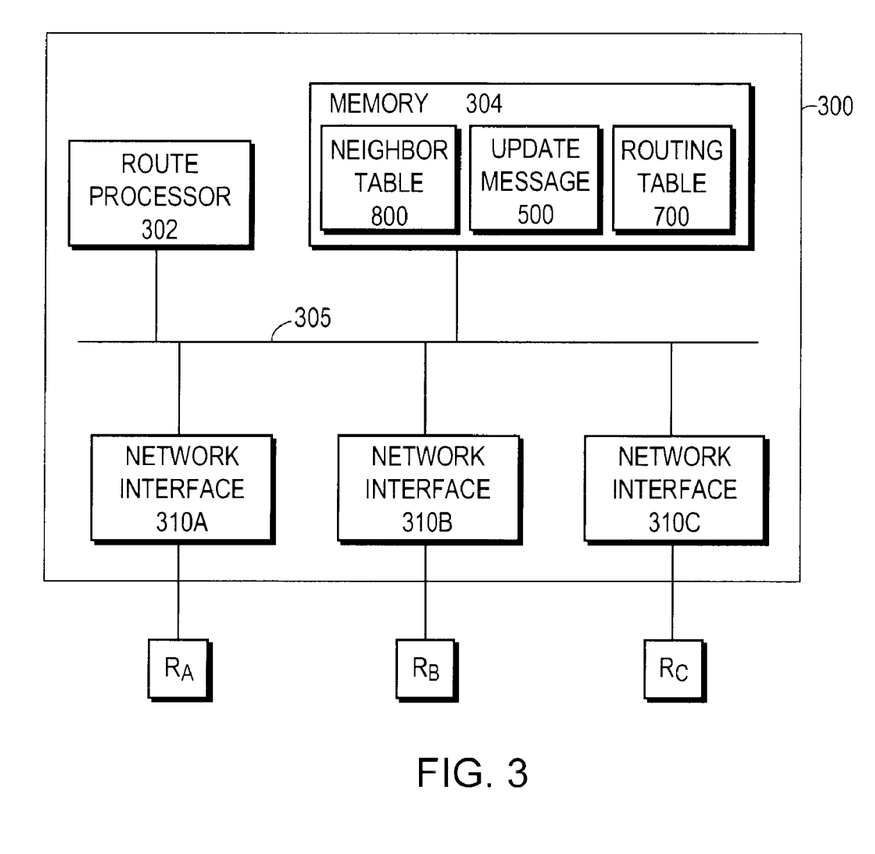
FIG. 3 is a schematic block diagram of an interdomain router comprising a route processor coupled to a memory and a plurality of network interfaces.

Each router typically comprises a plurality of interconnected elements, such as a processor, a memory and a network interface adapter. FIG. 3 is a schematic block diagram of an interdomain router 300 comprising a route processor 302 coupled to a memory 304 and a plurality of network interface adapters $310_{A-C}$ via a bus 305. The network interfaces $310_{A-C}$ are coupled to external interdomain routers $R_{A-C}$. The memory 304 may comprise storage locations addressable by the processor and interface adapters for storing software programs and data structures associated with the inventive selective routing update generation mechanism and technique. For example, the memory 304 may store data structures such as update message 500, routing table 700 and neighbor table 800, the contents of which are described further herein.

The route processor 302 may comprise processing elements or logic for executing the software programs and manipulating the data structures. An operating system, portions of which are typically resident in memory 304 and executed by the route processor, functionally organizes the router by, inter alia, invoking network operations in support of software processes executing on the router. It will be apparent to those skilled in the art that other processor and memory means, including various computer readable media, may be used for storing and executing program instructions pertaining to the inventive technique described herein.

Figure 4:
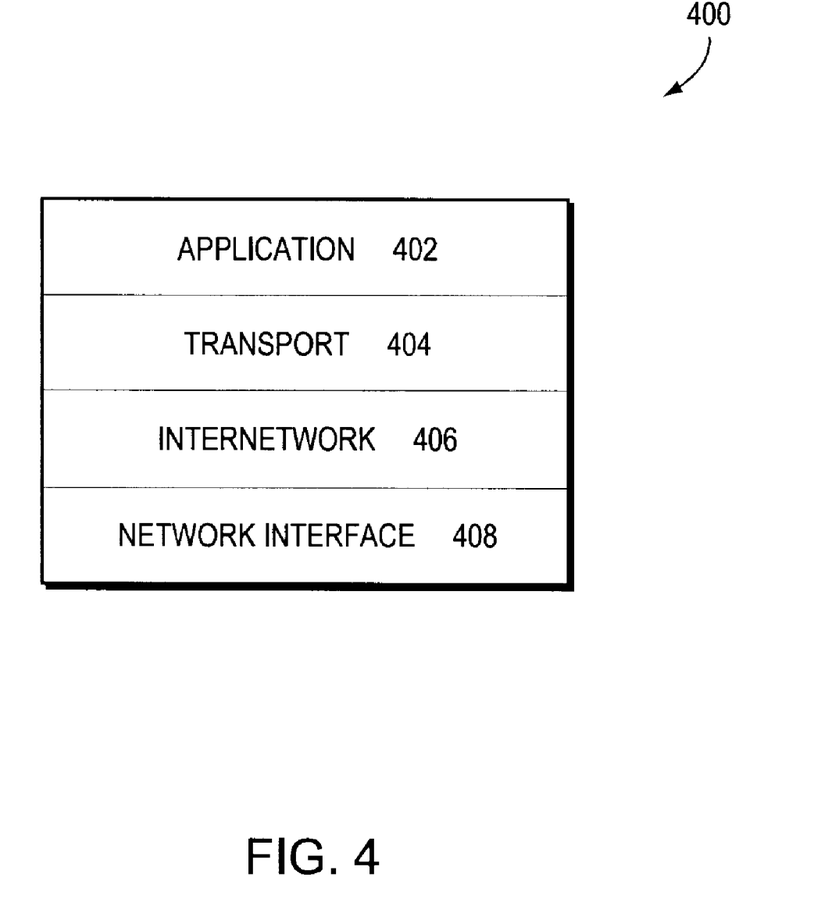
FIG. 4 is a schematic block diagram of a conventional protocol stack, such as the Internet communications protocol stack, within the interdomain router of FIG. 3.

A key function of the interdomain router is determining the next node to which a packet is sent; in order to accomplish such "routing", the interdomain routers 300 cooperate to determine optimal paths through the computer network 200. The routing function is preferably performed by an internetwork layer of a conventional protocol stack within each router. FIG. 4 is a schematic block diagram of a conventional protocol stack, such as the Internet communications protocol stack 400. The architecture of the Internet protocol stack 400 is represented by four layers termed, in ascending interfacing order, the network interface layer 408, the internetwork layer 406, the transport layer 404 and the application layer 402.

The lower network interface layer 408 is generally standardized and implemented in hardware and firmware, whereas the higher layers are typically implemented in the form of software. The primary internetwork layer protocol of the Internet architecture is the Internet Protocol (IP). IP is primarily a connectionless protocol that provides for internetwork routing, fragmentation and reassembly of exchanged packets—generally referred to as "datagrams" in an Internet environment—and which relies on transport protocols for end-to-end reliability. An example of such a transport protocol is the Transmission Control Protocol (TCP) which is implemented by the transport layer and provides connection-oriented services to the upper layer protocols of the Internet architecture. The term TCP/IP is commonly used to denote the Internet architecture.

In particular, the internetwork layer 406 concerns the protocol and algorithms that interdomain routers 300 utilize so that they can cooperate to calculate paths through the computer network 200. An interdomain routing protocol, such as the Border Gateway Protocol (BGP), is used to perform interdomain routing (for the internetwork layer) through the computer network 200. The interdomain routers 300 (hereinafter "neighboring peer routers") exchange routing and reachability information among the autonomous systems over a reliable transport layer connection, such as TCP. The BGP protocol "runs" on top of the transport layer to ensure reliable communication among the neighboring routers.

Figure 5:
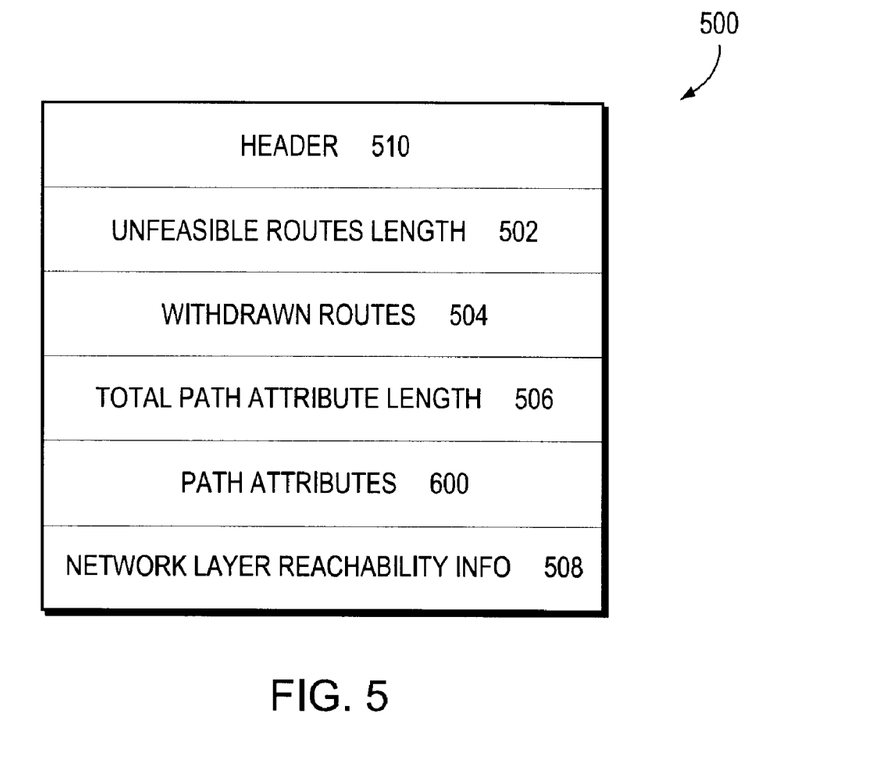
FIG. 5 is a schematic block diagram of a conventional update message, such as a Border Gateway Protocol (BGP) update message that may be advantageously used with the present invention.
Figure 7:
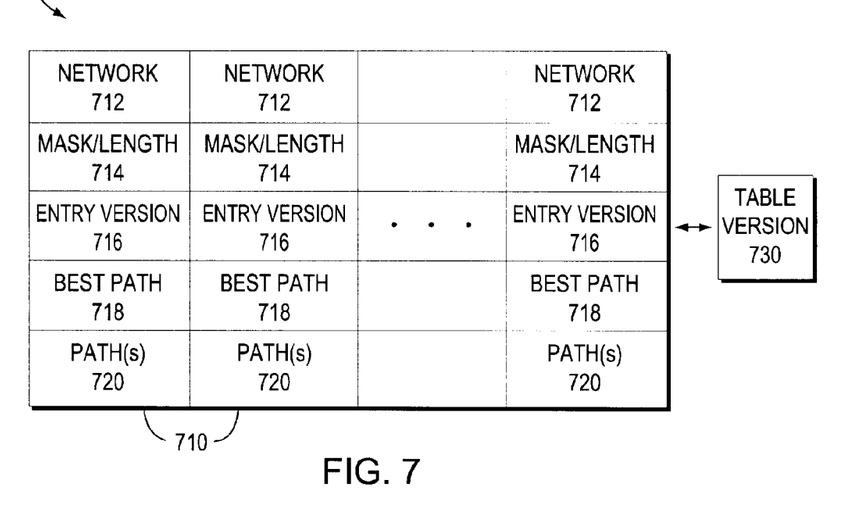
FIG. 7 is a schematic block diagram of a routing table having a plurality of routing table entries.

In order to perform routing operations in accordance with the BGP protocol, each interdomain router 300 maintains a routing table 700 that lists all feasible paths to a particular network. The routers further exchange routing information using routing update messages 500 when their routing tables change. The routing update messages are generated by an updating (sender) router to advertise optimal paths to each of its neighboring peer (receiver) routers throughout the computer network. These routing updates allow the BGP routers of the autonomous systems to construct a consistent and up-to-date view of the network topology.

Figure 6:
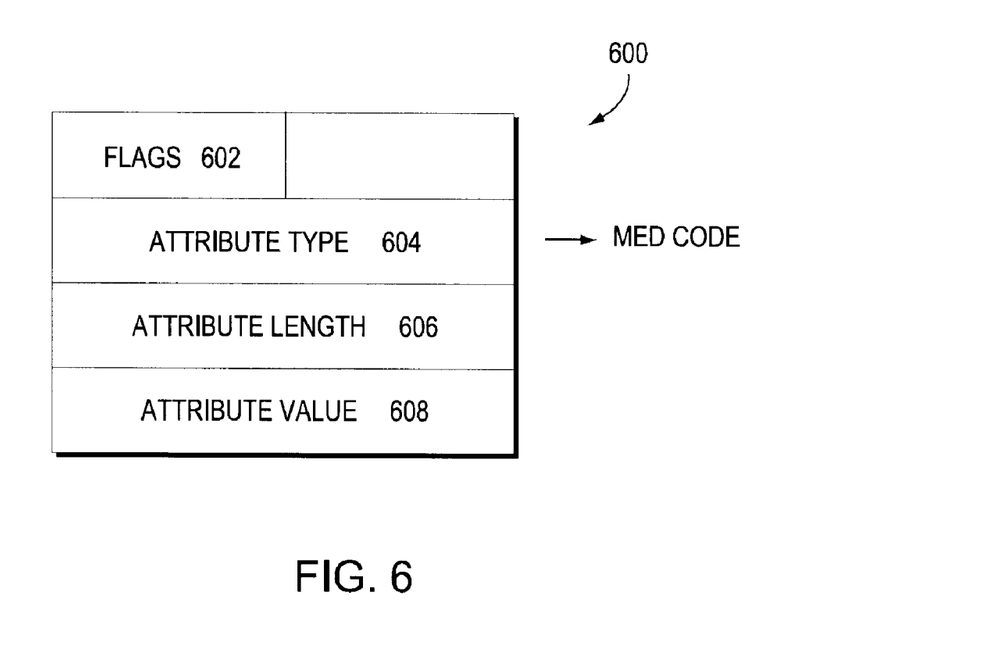
FIG. 6 is a schematic block diagram of a path attributes field of the BGP update message including an attribute type subfield which may specify, for example, a multi-exit discriminator code that may be advantageously used with the present invention.

FIG. 5 is a schematic block diagram of a conventional BGP update message 500 comprising a plurality of fields appended to a header 510. An unfeasible routes length field 502 indicates the total length of a withdrawn routes field 504, which contains a list of IP address prefixes for the routes being withdrawn from service. A total path attribute length field 506 indicates the total length of a path attributes field 600 and a network layer reachability information field 508 contains a list of IP address prefixes. The format and function of the update message 500 is described in RFC 1771 and *Interconnections, Bridges and Routers*.

Specifically, the path attributes field 600 comprises a sequence of fields, each describing a path attribute in the form of a triple (i.e., attribute type, attribute length, attribute value). FIG. 6 is a schematic block diagram of the path attributes field 600 comprising a plurality of subfields including a flags subfield 602, an attribute type subfield 604, an attribute length subfield 606 and an attribute value subfield 608. In particular, the attribute type subfield 604 specifies a plurality of attribute type codes, an example of which includes a multi-exit discriminator (MED) code. The MED code is an optional nontransitive attribute. The MED value may be used by an updating BGP sender's decision process to discriminate among multiple exit points to a neighboring autonomous system.

FIG. 7 is a schematic block diagram of a routing table 700 comprising a plurality of route entries 710, each of which includes a plurality of fields. Specifically, route entry 710 includes a network field 712 containing a network portion of an IP address identifying a network, a mask/length field 714 containing a mask for differentiating between the network portion of the IP address and a host portion, and an entry version number field 716 containing a version number of the entry. A path field 720 contains one or more paths, wherein each path describes the "next hop" address or interface 310 of the neighbor or other path attributes 600 of routes in the computer network, while a bestpath field 718 contains the best path from among the paths described in field 720 based on pre-specified route selection criteria.

The routing table 700 further includes a table version number 730 that is used to indicate a "level" of the routing table. The table version number 730 is incremented each time there is a change to the routing table 700. The entry version number 716 is used for incremental update operations. Thus, each time there is a change to an entry 710, such as when the entry is added or deleted or when there is a best path change, the table version number 730 is incremented and the entry version number 716 is set to that incremented value.

Figures 8, 9:
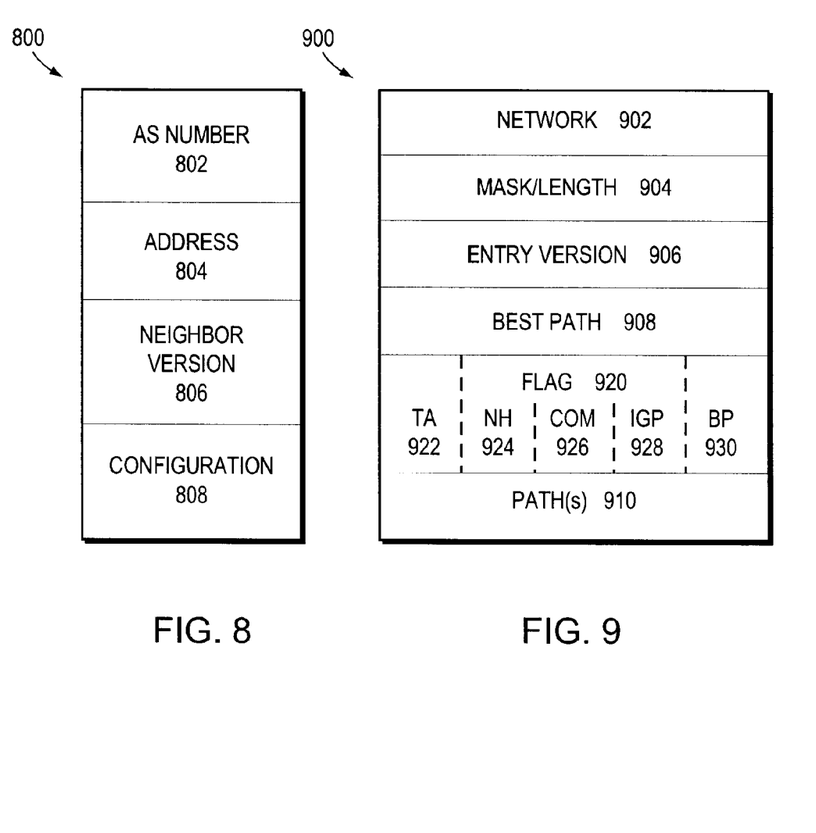
FIG. 8 is a schematic block diagram of a neighbor data structure that may be advantageously used with the present invention.
FIG. 9 is a schematic block diagram of a modified routing table entry that includes a flag field containing a plurality of change flags in accordance with the present invention.

In addition, a neighbor version number is maintained in a neighbor data structure, such as a table, for each neighbor to indicate whether the neighbor is up-to-date with all route changes in the routing table 700. FIG. 8 is a schematic block diagram of the neighbor table 800 containing at least one entry having the following fields. An AS number field 802 contains a number of the autonomous system (AS), an address field 804 contains the IP address of the neighbor peer, a neighbor (table) version field 806 contains the neighbor version number and a configuration field 808 contains configuration parameters. An example of a configuration parameter is "neighbor not configured to receive an interior gateway protocol (IGP) metric as a MED value". As noted, the neighbor version number 806 denotes the "level" (of the table version) at which the neighbor has been updated.

The routing update messages 500 transmitted to the neighboring peer routers $R_{A-C}$ are typically generated by the updating router "walking-through" the routing table 700, identifying any changes and applying appropriate routing policies. Generation of the routing update message typically involves the following steps of a conventional update process: (1) identifying a route (i.e., best path) in the routing table that has changed; (2) applying a per-neighbor route filtering policy, if appropriate; and (3) formating an update message, if appropriate. Specifically, when the neighbor version number 806 is less than that of the table version number 730, the router scans the table 700 to identify all entries 710 for which update messages should be sent to the neighbor. If an entry version number 716 is greater than the neighbor version number 806 (Step 1), the route in the entry has changed since the previous update of the neighbor. The router then determines whether an update of the route/best path is permitted by the routing policy, such as route filtering, configured for the neighbor (Step 2). If so, an update message is formated by the router (Step 3).

After evaluating (and advertising, if necessary) all entries in the route table 700, the router sets the neighbor version number 806 equal to the table version number 730, thereby completing a round of incremental update operations. In certain situations, however, routing updates are not necessary for a neighbor having a neighbor version number 806 that is less than an entry version number 716. The present invention is directed to a technique that allows selective generation of routing update messages by an interdomain router for its neighboring peer routers within autonomous systems of a computer network.

Broadly stated when there is a change in the best path of a route, not only is the entry version number 716 of the route incremented, but the reason (i.e., "what has changed") for the change in the best path of the route is identified and recorded. That is, each time there is a new version of a route, the router compares the attributes of the best path for the new entry version number of the route and the previous entry version number of the route, and then records the changes. These attributes comprise path attributes that may, for example, be stored in path attributes field 600 or in various data structures of memory 304. According to the selective routing update technique, recordation of the changed attributes is effected using novel change flags. These flags, along with the characteristics (configuration parameters) of each neighbor peer router, are processed by the router when determining whether the route is eligible for further consideration of routing updates to the neighbor.

FIG. 9 is a schematic block diagram of a modified routing table entry 900 that includes a flag field 920 containing a plurality of change flags 922–930. Each change flag is preferably a single bit having asserted and non-asserted states set by the router. In the illustrative embodiment, there is a flag used to reflect each of the following changes: (i) transitive attribute (TA) change flag 922; (ii) next-hop (NH) change flag 924; (iii) community (COM) change flag 926; (iv) IGP metric change flag 928; and (v) best path (BP) change flag 930. Of course, additional (or fewer) change flags may be used in accordance with the principles of the invention to record additional (or fewer) changed attributes.

The change flags are preferably cumulative and cleared after the current version of a route has been evaluated (and sent, if appropriate) for all neighbors. For example, if the entry version number of a route entry is incremented solely because of an IGP metric change, then only the IGP metric change bit flag 928 is asserted within flag field 920 of the entry 900. Thereafter in accordance with an improved routing update message generation process described below, the router examines the state of flag 928 and, depending upon the configuration parameters stored in configuration field 808 of neighbor table 800 for the receiving neighbor, determines whether a routing update message needs to be generated for that neighbor. If the configuration parameters indicate that the receiving neighbor does not require notice of such a change, then generation of routing update message for the neighbor can be skipped.

In accordance with the selective routing update technique, a novel step is added to the conventional update process to provide the improved routing update message generation process. The steps of the improved process include: (1) identifying a route (i.e., best path) in the routing table that has changed; (2) applying a per-neighbor route filtering policy, if appropriate; (2A) determining whether the update can be skipped based on the attribute change flags and the configuration parameters of the neighbor; and (3) formating an update message for the neighbor, if an update is appropriate and should not be skipped. In other words, if the states of the change flags indicate that the change in the routing table entry does not affect (i.e., is immaterial or irrelevant to) a particular neighbor (as indicated by the configuration parameters), then generation of an update message relating to the entry for that neighbor may be obviated (skipped).

An advantage of the novel technique described herein involves the preservation of sender and receiver router resources that would otherwise be used to generate/transmit and process unnecessary routing update messages. Minimizing the generation of unnecessary (i.e., duplicate) routing update messages improves network stability and scalability. In addition, the selective routing update technique provides a foundation for extending functionality in the area of routing updates.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for selectively generating routing update messages by a router for its neighbor routers of a computer network, the router including a routing table having at least one entry, the method comprising the steps of:

incrementing an entry version number of the entry in the routing table in response to a change in a best path of a route stored in the entry;

comparing attributes of the best path for a new version and a previous version of the route; and if the attributes have changed, recording the changes using change flags.

2. The method of claim 1 further comprising the steps of:

identifying the changed best path in the routing table; and applying a route filtering policy for each neighbor router.

3. The method of claim 2 further comprising the steps of:

determining whether generation of a routing update message can be skipped based on states of the change flags and configuration parameters of the neighbor routers; and skipping generation of the routing update message for each neighbor router that is not affected by the changed best path as indicated by the change flags and configuration parameters.

4. The method of claim 3 wherein the step of recording the changes comprises the steps of:

modifying the entry of the routing table to include a flag field having a plurality of change flags; and setting the states of the change flags to reflect the changed attributes.

5. The method of claim 4 wherein an attribute may comprise an optional non-transitive attribute.

6. The method of claim 5 wherein the optional non-transitive attribute comprises a multi-exit discriminator code.

7. The method of claim 4 further comprising the step of providing a neighbor data structure for each neighbor router, the neighbor data structure containing at least one entry having a configuration field containing the configuration parameters.

8. The method of claim 7 wherein the step of determining comprises the steps of:
   examining the states of the change flags in the flag field of the modified routing table entry; and
   examining the configuration parameters stored in the configuration field of the neighbor data structure.

9. The method of claim 8 further comprising the steps of, wherein the neighbor data structure is a neighbor table:
   providing a table version number for the routing table, the table version number indicating a level of the routing table;
   incrementing the table version number each time there is a change to the routing table; and
   setting the entry version number to the incremented table version number in response to the change to the entry of the routing table.

10. The method of claim 9 wherein the change to the entry may comprise one of adding and deleting the entry.

11. The method of claim 10 wherein the change to the entry may further comprise a change to the best path of the route of the entry.

12. The method of claim 9 further comprising the step of providing a neighbor version number for the neighbor table, the neighbor version number indicating whether the neighbor is up-to-date with all best path changes in the routing table.

13. The method of claim 12 wherein the step of identifying the changed best path comprises the steps of:
   comparing the neighbor version number with the table version number;
   if the neighbor version number is less than the table version number, scanning the routing table to identify all entries of the table for which update messages should be sent.

14. The method of claim 13 wherein the step of scanning comprises the steps of:
   comparing the neighbor version number with the entry version number of each entry; and
   rendering a route entry eligible for further consideration of routing updates to a neighbor if its entry version number is greater than the neighbor version number.

15. The method of claim 14 further comprising the step of setting the neighbor version number to the table version number after all entries in the route table have been evaluated and advertised, if necessary, for the neighbor.

16. Apparatus for selectively generating routing update messages by a router for its neighboring peer routers of a computer network, the router including a routing table having at least one entry, the apparatus comprising:
   means for incrementing an entry version number of the entry in the routing table in response to a change in a best path of a router stored in the entry;
   means for comparing attributes of the best path for a new version and a previous version of the route; and
   means for recording any changes to the attributes using change flags.

17. The apparatus of claim 16 further comprising:
   means for identifying the changed best path in the routing table; and
   means for applying a route filtering policy for each neighboring peer router.

18. The apparatus of claim 17 further comprising:
   means for determining whether generation of a routing update message can be skipped based on states of the change flags and configuration parameters of the neighboring peer routers; and
   means for skipping generation of the routing update message for each neighboring peer router that is not affected by the changed route as indicated by the change flags and configuration parameters.

19. A data structure stored in a memory of a router and used to selectively generate routing update messages for neighbor routers of a computer network, the data structure comprising:
   a routing table having a plurality of entries, each entry comprising a path field and a bestpath field, the path field containing one or more paths describing path attributes of routes in the computer network, the bestpath field containing a best path of a route from among the paths contained in the path field,
   each entry of the routing table further comprising a flag field containing a plurality of change flags, the change flags having states set to reflect changes in attributes associated with the best path for a new version and a previous version of the route.

20. A computer readable medium containing executable program instructions for selectively generating routing update messages by a router for its neighbor routers of a computer network, the router including a routing table having at least one entry, the executable program instructions comprising program instructions for:
   incrementing an entry version number of the entry in the routing table in response to a change in a best path of a route stored in the entry;
   comparing attributes of the best path for a new version and a previous version of the route;
   if the attributes have changed, recording the changes using change flags;
   identifying the changed best path in the routing table; and
   applying a route filtering policy for each neighbor router;
   determining whether generation of a routing update message can be skipped based on states of the change flags and configuration parameters of the neighbor routers; and
   skipping generation of the routing update message for each neighbor router that is not affected by the changed best path as indicated by the change flags and configuration parameters.

21. A method for sending routing update messages by a router, comprising:
   selecting a neighbor router for possibly sending a routing update message to the neighbor router;
   testing a plurality of change flags in a router table entry for routes to the neighbor router;
   determining to send the routing update message in the event that at least one of the change flags of the plurality of change flags indicates that policy requires that a routing update message be sent; and
   sending the routing update message in the event that the determining step requires that a routing update message be sent.

22. The method of claim 21, further comprising:
   the testing step includes testing a transitive attribute change flag.

23. The method of claim 21, further comprising:
   the testing step includes testing a next hop change flag.

24. The method of claim 21, further comprising:
   the testing step includes testing a community change flag.

25. The method of claim 21, further comprising:
the testing step includes testing an IGP metric change flag.

26. The method of claim 21, further comprising:
the testing step includes testing a best path change flag.

27. The method as in claim 21, further comprising:
determining that policy requires that a routing update message be sent in response to configuration parameters stored in a configuration field of a neighbor table including the neighbor router, and in response to the plurality of change flags.

28. A router, comprising:
a processor to select a neighbor router for possibly sending a routing update message to the neighbor router;
a plurality of change flags in a router table entry for routes to the neighbor router;
a network interface to send the routing update message in the event that at least one of the change flags of the plurality of change flags indicates that policy requires that a routing update message be sent, and the processor sending the routing update message in the event that at least one of the change flags of the plurality of change flags indicates that the routing update message is to be sent.

29. The router of claim 28, further comprising:
one of the change flags is a transitive attribute change flag.

30. The router of claim 28, further comprising:
one of the change flags is a next hop change flag.

31. The router of claim 28, further comprising:
one of the change flags is a community change flag.

32. The router of claim 28, further comprising:
one of the change flags is an IGP metric change flag.

33. The router of claim 28, further comprising:
one of the change flags is a best path change flag.

34. The router of claim 28, further comprising:
the processor determines that policy requires that a routing update message be sent in response to configuration parameters stored in a configuration field of a neighbor table including the neighbor router, and in response to the plurality of change flags.

35. A router comprising:
means for selecting a neighbor router for possibly sending a routing update message to the neighbor router;
means for testing a plurality of change flags in a router table entry for routes to the neighbor router;
means for determining to send the routing update message in the event that at least one of the change flags of the plurality of change flags indicates that policy requires that a routing update message be sent; and
means for sending the routing update message in the event that the determining step requires that a routing update message be sent.

36. The apparatus as in claim 35, further comprising:
the testing step includes testing a transitive attribute change flag.

37. The apparatus as in claim 35, further comprising:
means for testing a next hop change flag.

38. The apparatus as in claim 35, further comprising:
means for testing a community change flag.

39. The apparatus as in claim 35, further comprising:
means for testing an IGP metric change flag.

40. The apparatus as in claim 35, further comprising:
means for testing a best path change flag.

41. The apparatus as in claim 35, further comprising:
means for determining that policy requires that a routing update message be sent in response to configuration parameters stored in a configuration field of a neighbor table including the neighbor router, and in response to the plurality of change flags.

42. A computer readable media, comprising:
said computer readable media having instructions written thereon for execution on a processor for the practice of the method of claim 1 or claim 21.

43. Electromagnetic signals propagating on a computer network, comprising:
said electromagnetic signals carrying instructions for execution on a processor for the practice of the method of claim 1 or claim 21.

* * * * *

UNITED STATES PATENT AND TRADEMARK OFFICE
CERTIFICATE OF CORRECTION

PATENT NO.     : 6,567,380 B1                                                        Page 1 of 1
DATED          : May 20, 2003
INVENTOR(S)    : Enke Chen It is certified that error appears in the above-identified patent and that said Letters Patent is hereby corrected as shown below:

Column 1,
Line 10, delete "6,392,497" and substitute therefore -- 6,392,997 --

Signed and Sealed this

Fourth Day of November, 2003

JAMES E. ROGAN
*Director of the United States Patent and Trademark Office*